J. KOZAK.
AUTOMOBILE TIRE.
APPLICATION FILED JUNE 24, 1918.

1,289,478.

Patented Dec. 31, 1918.
2 SHEETS—SHEET 1.

Inventor
J. Kozak

By
N. M. Wilson
Attorney

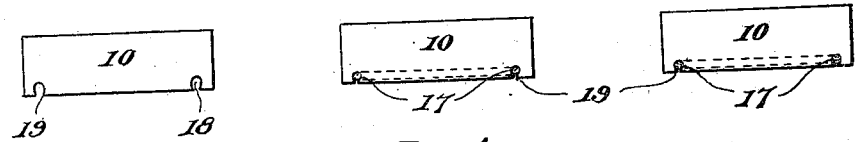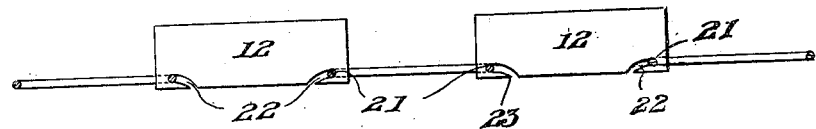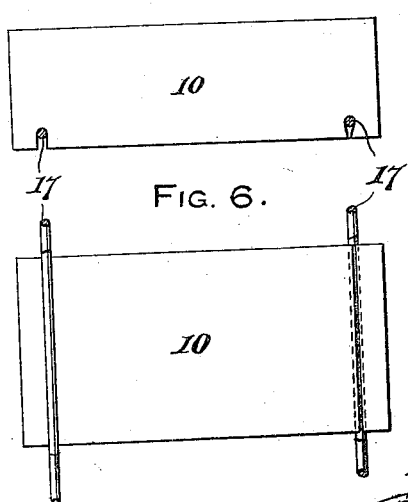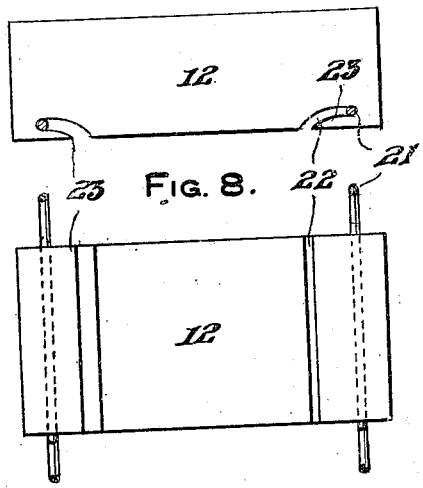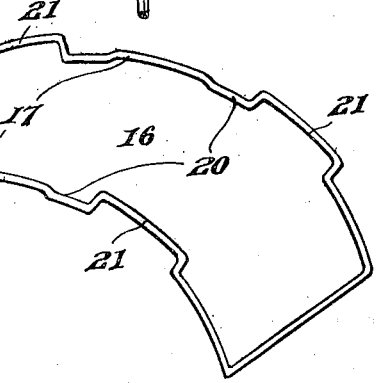

UNITED STATES PATENT OFFICE.

JOHN KOZAK, OF MILWAUKEE, WISCONSIN.

AUTOMOBILE-TIRE.

1,289,478.   Specification of Letters Patent.   Patented Dec. 31, 1918.

Application filed June 24, 1918. Serial No. 241,551.

*To all whom it may concern:*

Be it known that I, JOHN KOZAK, a citizen of Poland, having declared my intention to become a citizen of the United States of America, residing at Milwaukee, in the county of Milwaukee and State of Wisconsin, have invented certain new and useful Improvements in Automobile-Tires, of which the following is a specification.

The primary object of the invention is the provision of a block tread tire arranged for mounting tread blocks in a position capable of slightly shifting during the flexing of the tire although the blocks are prevented from leaving the tire by suitable means embedded therein during the manufacture of the tire.

A further object of the invention is the provision of a simple and inexpensive means for retaining block members upon the tread portion of a vehicle tire whereby the blocks may shift slightly during travel without being detached from the tire, the structure preventing skidding as well as affording added traction facilities for the tire.

In the drawings forming a part of this application and in which similar reference characters designate corresponding parts throughout the several views, Figure 1 is a transverse sectional view through a tire formed after the manner of my invention.

Fig. 3 is an elevational view of some of the central block members with their connecting wires in section.

Fig. 4 is a similar view of some of the side tread block members with their connecting wires in section.

Fig. 5 is an enlarged elevational view of one of the blocks with its attaching wires shown in section partially secured in position.

Fig. 6 is a bottom plan view thereof.

Fig. 7 is a view similar to Fig. 5 of one of the side blocks.

Fig. 8 is a view of the same similar to Fig. 6, and

Fig. 9 is a perspective view of one of the block securing frame employed with the device.

Figure 1:
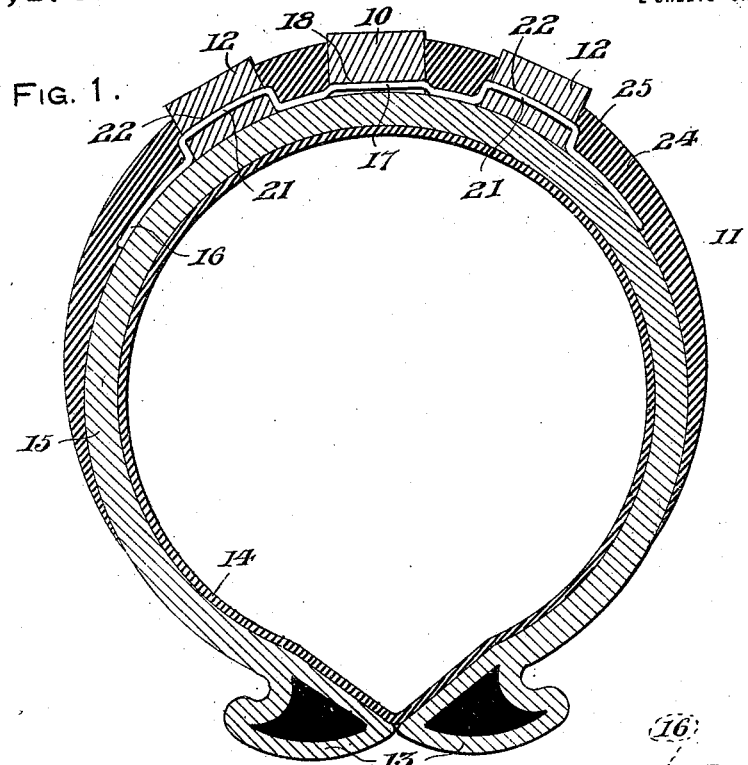
Figure 2:
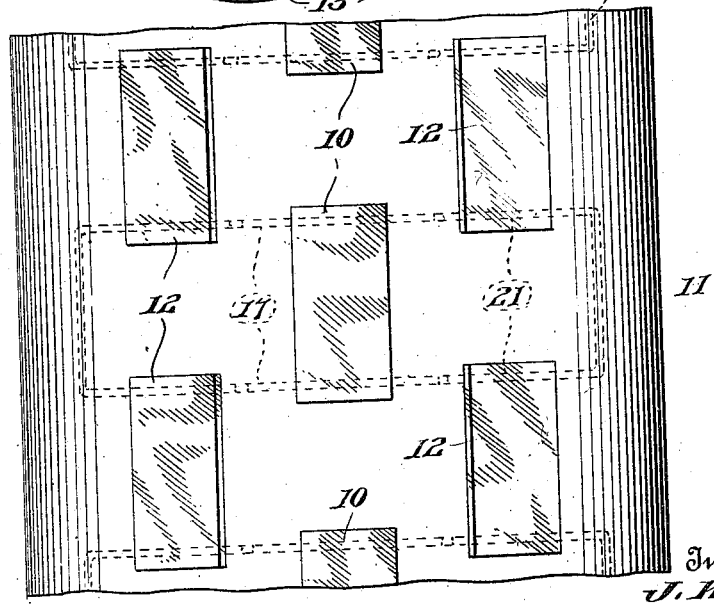
Fig. 2 is a fragmentary plan view thereof.

Referring more in detail to the drawings, a plurality of tread blocks 10 are provided adapted for spaced arrangement centrally of the tread portion of a tire shoe such as 11 while slightly different blocks 12 are adapted for positioning in staggered relation at opposite sides of the rows of the blocks 10. It will be understood that my device may be employed as a non-skid means for any form of tire shoe, the said shoe 11 being of the usual clencher type having opposite beads 13 at the base thereof and adapted for holding a pneumatic tube 14 while the main body or canvas carcass of the shoe is indicated at 15.

A plurality of substantially rectangular wire frames 16 are bent in arcuate arrangement for mounting upon the outer surface of the tread portion of the carcass 15. The frames 16 are provided entirely around the tread portion of the tire shoe and are equally spaced apart having slightly raised central portions 17 for mounting one of the blocks 10 upon each frame with the raised portions 17 positioned within transverse grooves 18 in the bottom of each block.

By mounting a block 10 upon the frame 16 centrally thereof in the manner noted and pounding inwardly, the edges 19 of the grooves 18 for retaining the raised portions 17 therein, the frame 16 will be greatly strengthened by being centrally braced by its respective block 10. The raised portions 17 moreover will in this manner be journaled in the grooves 18 although the blocks 10 will be prevented from accidental detachment from the said frame. Each frame 16 has its opposite curved sides 20 further provided with substantially U-shaped spaced offsets 21. The blocks 12 are provided with oblique and slightly curved slots 22 in the bottoms thereof whereby the adjacently positioned frames 16 are linked together by positioning the offsets 21 of the adjacent frames within the slots 22 of the blocks 12. The edges 23 of the slots 22 are then bent inwardly toward the body of the block reducing the outer ends of the slots 22 and preventing the offsets 21 of the frames 16 from passing outwardly of the slots. In this manner, the blocks 12 have slight relative movement upon the frames 16 but are prevented from being detached therefrom.

The frames 16 are provided with the central blocks 10 and with the side rows of blocks 12 and then mounted upon the tread portion of the shoe 11 in any desired manner when the device is so positioned upon a shoe, the blocks may shift slightly during the travel of the tire upon the roadway without detaching any of the blocks from the shoe. The manner of securing the frame 16 with the tread blocks upon the carcass 15 herein illustrated consists of molding rubber 24 upon the entire tread portion of the carcass 15 and around the sides thereof so as to envelop the frame 16 but permit the outer portions of the blocks 10 and 12 to project from the outer smooth surface 25 of the rubber tread 24. All of the said blocks project substantially an equal distance from the tread rubber 24 so as to present a uniform appearance upon the tire and providing a gripping surface as well as a non-skid means for the tire. The frames 16 being individually braced by the blocks 10 and linked together by means of the blocks 12, a metal protector is formed which is secured in the manner described upon the tread portion of the tire and prevents the wearing of the shoe. The rubber tread 24 may be formed upon the shoe in any desired manner either by molding or by the usual process of building up a layer structure of rubber suitably vulcanized together after being formed.

What I claim as new is:—

1. In combination with a tire shoe member, rectangular frames spaced apart around the tread thereof of substantially the same arcuate form as the tread, a central row of blocks around the tread transversely secured to each of said frames and a row of blocks at each side of said central row pivotally connecting the adjacently positioned frames together.

2. In combination with a tire shoe member having a tread portion, a plurality of rectangular frames spaced upon said tread portion arcuately bent and having U-shaped offsets, a block centrally secured spanning each of said frames and blocks having inclined slots mounted over the said offsets whereby the adjacent frames are linked together.

3. In combination with a tire shoe member having a tread portion, a plurality of rectangular frames spaced upon said tread portion arcuately bent and having U-shaped offsets, a block centrally secured spanning each of said frames, blocks having inclined slots mounted over the said offsets whereby the adjacent frames are linked together, the edges of said slots being bent inwardly adapted for preventing the detachment of said blocks from the offsets while permitting relative movement therebetween and a rubber tread portion for the shoe enveloping said frames with the outer portions of the blocks projecting therefrom adapted to engage the roadbed.

4. A non-skid member for tires comprising rectangular frames bent into arcuate form and having central raised portions and outward offsets at opposite sides of said raised portions, tread blocks having transverse grooves secured upon said raised portions, and rows of blocks having inclined slots receiving said offsets of adjacently positioned frames whereby the frames are pivotally connected together with the device in annular formation.

5. A tire protector comprising rectangular wire frames, blocks having inclined slots receiving portions of said frames to connect the latter together, the outer ends of the slots being contracted whereby the blocks are adapted for slight sliding as well as pivotal movement upon said frames, and centrally carried blocks bridging the opposite sides of each frame and connecting the same.

In testimony whereof I affix my signature.

JOHN KOZAK.